UNITED STATES PATENT OFFICE.

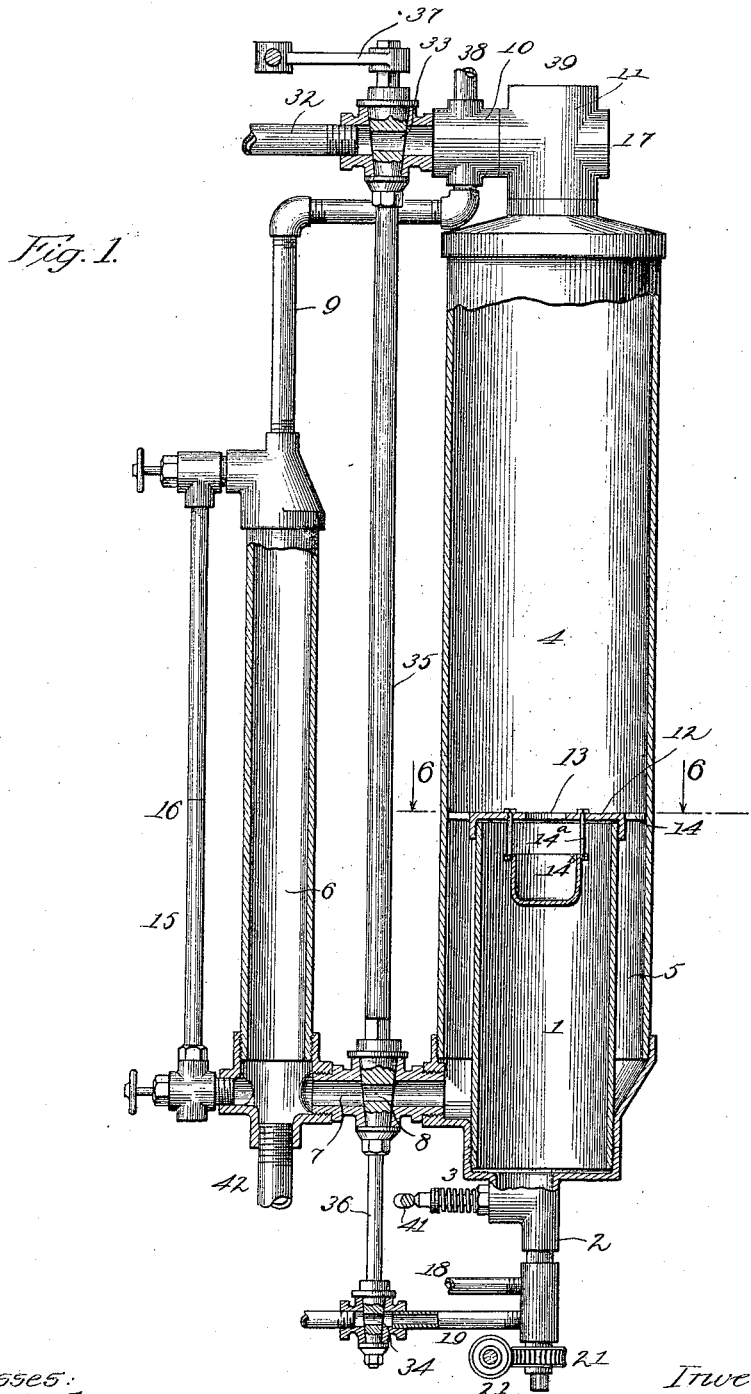

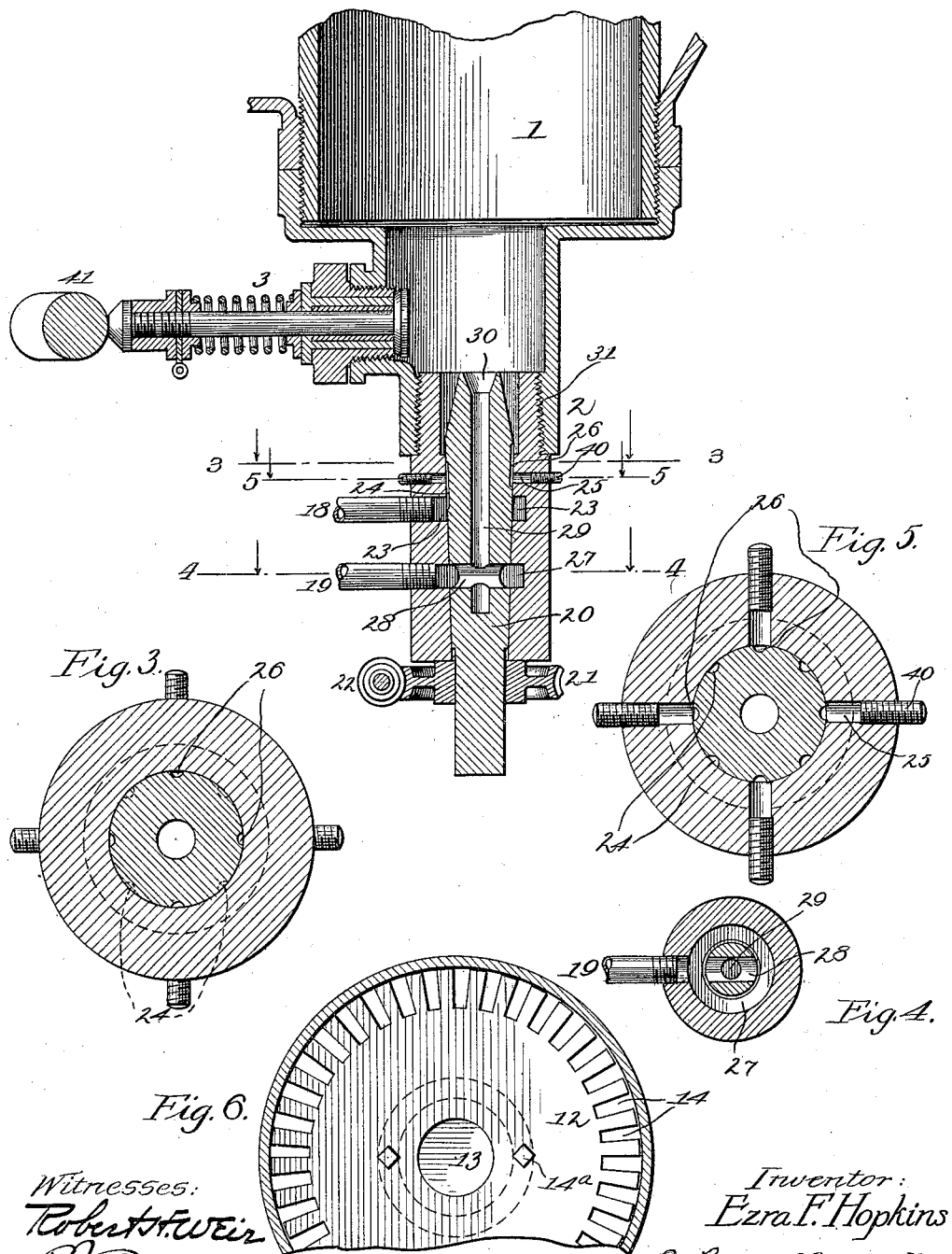

EZRA F. HOPKINS, OF CHICAGO, ILLINOIS.

POWER-GENERATING APPARATUS.

1,069,424.  Specification of Letters Patent.  Patented Aug. 5, 1913.

Application filed November 9, 1911. Serial No. 659,293.

*To all whom it may concern:*

Be it known that I, EZRA F. HOPKINS, a citizen of the United States, residing at Chicago, in the county of Cook and State of Illinois, have invented certain new and useful Improvements in Power-Generating Apparatus, of which the following is a specification.

This invention relates to an apparatus for generating an expansible or elastic fluid which may be used for actuating prime movers.

The object of the invention is to produce an apparatus of this character by which a fluid may be generated which has all the expansive properties of superheated steam, without the disadvantages, complications, and losses of a steam generating plant of the ordinary type.

In the accompanying drawings, Figure 1 is a vertical central section of the apparatus with portions in elevation. Fig. 2 is a vertical central section showing the details of the injector and spark plug. Fig. 3 is a section of the injector along the line 3 3 of Fig. 2. Fig. 4 is a section of the injector along the lines 4 4 of Fig. 2. Fig. 5 is a section along the lines 5 5 of Fig. 2. Fig. 6 is a partial section along line 6 6 of Fig. 1.

In Fig. 1 I have shown by way of example one form of apparatus embodying my invention, but I wish to have it understood that the invention is capable of various modifications and I do not therefore limit the invention to the form and arrangement herein shown and described.

In carrying out my invention, I may provide a combustion chamber in which a suitable mixture of gas or oil and air is exploded, a portion of the chamber being surrounded by a water jacket into which water passes from an adjoining tank. This water is evaporated by the heat from the burned gases, and the steam is heated to a high temperature when it passes into a reservoir connecting with the combustion chamber, the hot gases from the combustion chamber passing also into the reservoir.

Referring to Fig. 1: The mixed air and fuel pass into the combustion chamber 1 by means of the injector 2, and are exploded by means of the spark plug 3. From this combustion chamber 1 the hot gases resulting from the combustion pass into the gas reservoir 4. Surrounding the combustion chamber is the water chamber 5 into which water passes from a water tank 6 through the pipe 7 and valve 8. The upper end of the water tank 6 may be connected with the reservoir 4 in any suitable manner, such as by a pipe 9 and the pipe fittings 10 and 11, whereby the pressure on the surface of the water in the tank 6 is maintained approximately the same as the pressure of the gas in the reservoir 4, so that the water in the tank 6 will be at approximately the same level as in the chamber 5 or the reservoir 4. The lower end of the tank may be connected with a feed pump by means of the pipe 42. By maintaining sufficient water in the tank, the water in chamber 5 will rise up to the plate 12 and through the openings 14, Fig. 6. It will then spread over this plate in a thin layer and pass over the edges of the opening 13 in the center of the plate 12.

As fuel and air are constantly passing in and exploding in the combustion chamber 1, there will be a constant stream of hot gas passing upward against plate 12 and through the opening 13. This will strike the over-flowing water and drive it upward into the reservoir 4 in the form of a fine spray which will quickly evaporate into steam and then be superheated by the hot gas.

In order to conveniently maintain the water level in the reservoir 4 constant and slightly above the plate 12, a water gage 15 may be placed adjacent to the water tank, and, if desired, a mark 16 may be placed on the gage to indicate the proper level. Also a thermometer may be inserted at 17, a pressure gage at 38 and a pop valve at 39.

To further provide against irregularities in the water level, a vessel 14$^b$ may be placed in the combustion chamber, supported as indicated by rods 14$^a$ passing through the plate 12, or in any other suitable manner, so that any surplus of water passing into the opening 13 not carried upward by the ascending gases will fall into said vessel and there be evaporated instead of passing to the lower end of the combustion chamber and possibly interfering with the ignition of the gases.

In order to introduce fuel into the combustion chamber in a suitable manner without danger of backfiring, an injector 2 may be used, which is comprised of a fuel inlet 18 and an air inlet 19, the taper member 20, which is rotatably mounted at the longitudinal axis of the injector, and suitable means for rotating the same. Said means may be a worm gear 21 actuated by the worm 22, which in turn may be operated by the engine or by any suitable or desired means.

A pressure in excess of the average internal pressure acts on the gas or liquid fuel and causes it to pass into the injector through the inlet 18, and fill the annular cavity 23 encircling the rotating member 20. A plurality of grooves 24 in the rotating member 20 open into and hence receive the fuel from the annular cavity 23, any vapor or air in the grooves being compressed by the external pressure. As the member 20 rotates, the compressed fuel in the grooves 24 will be delivered to a plurality of cavities 25, and these in turn will deliver the fuel to a plurality of grooves 26 in said member 20. The grooves 26 alternate with the grooves 24, but do not open into the annular cavity 23. The grooves 26 open into the combustion chamber 1, and thereby deliver the fuel into said chamber adjacent the opening 30. The slight clearance between the walls of the two members will be sufficient to allow the external pressure to be effective during the passage of the fuel. In the meantime, air, or some fluid containing oxygen, under sufficient pressure, enters through the inlet 19 into the annular groove 27, thence into the transverse passageway 28, and thence into the longitudinal passageway 29 and into the combustion chamber through the opening 30. As the fuel evaporates and passes the upper end of the rotating member 20 it mixes with the air entering the chamber through the opening 30. The quantity of fuel admitted may be governed by the rotative speed of the member 20, and by regulating the external pressure, or the volume of the cavities 25 by means of the screws 40, and the quantity of air may be regulated by any suitable means, such as the valve 34, or by varying the pressure of the air, or otherwise.

As the grooves 24 and 26 are not connected, and are at too great an angular distance on the rotative member to be connected by the cavities 25, a sufficiently closed joint is at all times maintained between the combustion chamber and the fuel supply cavity as to prevent any possibility of backfiring. As the cavity 27 encircles the rotative member 20, it allows a uniform quantity of air to pass through the passages 28 and 29 at all times. The injector may be attached to the combustion chamber by means of the threads 31, or by any other suitable means.

As the mixed fuel passes into the combustion chamber it is ignited by the spark plug 3, which may be actuated by a cam 41, operated by the engine, or in any other suitable manner.

The superheated steam mixed with the hot gases resulting from combustion may be allowed to pass out of the reservoir through the fittings 11 and 10 and the pipe 32 into the engine. The pipe 32 carries a throttle valve 33, the water pipe 7 carries a valve 8, and the air inlet pipe carries a valve 34. These valves, as indicated in Fig. 1, may be placed in a vertical line and connected by rods 35 and 36 in such a manner that they may be operated simultaneously by rotating the rods by means of a crank 37 located at the upper end. By some suitable means this crank may be connected with a speed governor on the engine so that the valves may be closed down gradually as the speed increases beyond any desired limit.

I claim as my invention:

1. In a power generating apparatus, the combination of a combustion chamber, an ignition device, a fuel injector, a water chamber surrounding said chamber, a water tank connected with said water chamber, and a gas reservoir, the bottom of said reservoir connected with said water chamber and said combustion chamber, and the top of said reservoir connected with the water tank.

2. In a power generating apparatus, the combination of a combustion chamber, a water chamber surrounding said combustion chamber, a plate covering said combustion chamber, an annular extension of said plate covering said water chamber, said plate having an opening in the portion covering the combustion chamber, and a plurality of openings in the portion covering said water chamber, a gas reservoir, said plate forming the bottom of the reservoir, and means for supplying said water chamber with water.

3. In a power generating apparatus, the combination of a combustion chamber having an ignition device therein, a water chamber surrounding said combustion chamber, a plate with peripherally located openings, a central opening therethrough, said chambers both horizontally covered by said plate, means for supplying water to said water chamber, means for supplying fuel to said combustion chamber; a gas reservoir; said water chamber opening into said reservoir through said peripheral openings in said plate, and said combustion chamber opening into said reservoir through said central opening in the plate.

4. In a power generating apparatus, the combination of a tubular reservoir, a transverse partition in said reservoir, a tubular chamber in said reservoir, said partition forming one end of said chamber, an annular space being provided between said reservoir and said chamber, said partition having an opening between said chamber and reservoir, and the partition having a plurality of openings between said annular space and said reservoir; means for supplying water to said annular space, and means for supplying fuel to said chamber, and an ignition device in the chamber.

5. In a power-generating apparatus, the combination of a combustion chamber; a water chamber surrounding said combustion chamber; a gas reservoir, said combustion chamber and said water chamber opening into said reservoir through openings located in approximately the same plane.

6. In a power-generating apparatus, the combination of a combustion chamber; a reservoir, a water chamber adjacent said combustion chamber; the upper ends of said chambers coinciding in height, and means for delivering water to said water chamber, the upper ends of said combustion chamber and said water chamber opening directly into said reservoir.

7. In a power-generating apparatus, the combination of a combustion chamber comprising an ignition chamber at its lower end, a flat cover at its upper end; an opening in the central portion of said cover; a vessel in said combustion chamber below said opening; a water chamber surrounding said combustion chamber; a reservoir above said water chamber opening into said reservoir; and means for supplying water to said water chamber and combustible gases to said combustion chamber.

8. In a power-generating apparatus, the combination of a combustion chamber; a water chamber adjacent thereto; a gas reservoir; a delivery pipe connected with said reservoir; a valve in said pipe; a pipe connecting said water chamber with a supply water tank; a valve in said pipe; an air-inlet pipe into said combustion chamber; a valve in said pipe; rods operatively connecting said valves, and means for operating said rods.

9. In a power generating apparatus, the combination of a combustion chamber; a water chamber adjacent thereto; a gas reservoir; a delivery pipe connected with said reservoir; a valve in said pipe; a pipe connecting said water chamber with a supply tank; a valve in said pipe; an air inlet pipe into said combustion chamber; a valve in said pipe; said three valves being alined vertically; rods operatively connecting said three valves, and means for operating said rods.

10. In a power-generating apparatus, the combination of a combustion chamber; a water chamber surrounding said combustion chamber; a water tank for supplying water to said water chamber; and a gas reservoir, said water chamber and said combustion chamber opening at their upper ends into said reservoir; and means for forcing water into said water tank and for supplying fuel to said combustion chamber, and an ignition device in said combustion chamber.

11. In a power-generating apparatus, the combination of a combustion chamber; a water chamber surrounding said combustion chamber; a gas reservoir, the upper ends of said combustion chamber and said water chamber opening directly into said reservoir, said openings lying in approximately the same plane; and means for supplying water to said water chamber.

12. In a power generating apparatus, the combination of a gas reservoir; a combustion chamber; a fuel supply pipe, and means for injecting fuel into said chamber consisting of a rotary member having a series of grooves therein, said grooves communicating with said fuel supply pipe; said member having a second series of grooves therein; and a fixed member encircling said rotary member, said fixed member having a plurality of cavities therein.

13. In a power-generating apparatus, the combination of a combustion chamber; a water chamber adjacent thereto; a gas reservoir; a delivery pipe connecting with said reservoir; a valve in said pipe; a pipe connecting said water chamber with a supply tank; a valve in said pipe; an air-inlet pipe into said combustion chamber; a valve in said pipe; and means for simultaneously operating said valves.

In testimony whereof I affix my signature in the presence of two witnesses.

EZRA F. HOPKINS.

Witnesses:
THOMAS J. JOHNSON,
FRANCES K. JOHNSON.

---

Copies of this patent may be obtained for five cents each, by addressing the "Commissioner of Patents, Washington, D. C."